United States Patent [19]
Morgolenko et al.

[11] 3,864,996
[45] Feb. 11, 1975

[54] DIE FOR CUTTING PIPES
[76] Inventors: Anatoly Sergeevich Morgolenko; Gennady Dmitrievich Selivanov, both of ulitsa Chkalova, 15; Igor Grigorievich Fedosenko, 602 mikroraion, 51, kv. 206; Vadim Grigorievich Kononenko, ulitsa Chkalova, 15; Vladimir Vasilievich Filippov, ulitsa Darvina, 7, kv. 24, all of Kharkov; Leonid Georgievich Lushnikov, ulitsa Michurina, 17, kv. 17, Krasnoyarsk; Zoya Alexandrovna Moiseeva-Smirnova, Moskovskoi oblasti, ulitsa Gagarina 38, kv. 26, Kaliningrad, all of U.S.S.R.

[22] Filed: Jan. 18, 1974
[21] Appl. No.: 434,564

[52] U.S. Cl. .............................. 83/5, 83/54, 83/404, 83/454, 83/467 A, 83/519, 83/593, 83/676
[51] Int. Cl. .............................................. B23d 21/00
[58] Field of Search .............. 83/519, 513, 5, 9, 54, 83/255, 404, 406, 391, 467 A, 454, 452, 593, 676

[56] References Cited
UNITED STATES PATENTS
| 2,243,614 | 3/1941 | Vogel | 83/519 X |
| 2,572,137 | 10/1951 | Grieder | 83/519 X |
| 2,606,613 | 8/1952 | Junkunc | 83/519 X |
| 2,879,844 | 3/1959 | Tuttle | 83/519 X |

*Primary Examiner*—J. M. Meister
*Assistant Examiner*—F. A. Silverberg
*Attorney, Agent, or Firm*—Waters, Roditi, Schwartz & Nissen

[57] ABSTRACT

In a die means providing the preliminary formation of a groove on the pipe surface at the point of cutting by a flat cutter comprise a disc cutter having a toothed sector defined by radiuses which differ from each other by an amount of the groove depth, and a recess for longitudinally moving the pipe, the surface of the recess being in equally spaced relation to the pipe surface.

2 Claims, 6 Drawing Figures

DIE FOR CUTTING PIPES

The present invention relates to the pipe-cutting equipment, and more specifically to dies for cutting pipes and hollow stock.

The die according to the invention may be most advantageously used in cutting thick-walled pipes having any wall thickness in the mass-scale production, where stringent requirements are imposed to the tool service life.

Known in the art is a die which permits to cut hollow stock, and more particularly pipes on presses without deforming the shape comprising a flat V-shaped cutter fixed to the upper plate of the die and adapted to penetrate between two bed dies mounted on the lower plate of the die and adapted to clamp the pipe being cut. Furthermore, this die is provided with means providing the preliminary formation of a groove on the pipe surface at the point of cutting, said means being mounted on the lower plate, operatively connected to the upper plate and comprising an additional flat cutter which is disposed in one and the same plate with the V-shaped cutter and is displaced perpendicularly with the respect to the movement of the flat V-shaped cutter.

The above-described die exhibits the following disadvantages.

It is known that the service life of a cutting tool depends upon the thickness of the metal layer being removed per one cutting edge, other conditions being identical, and hence it is desirable that an additional cutter have the maximum possible number of cutting edges. Taking in the account the fact that the additional cutter, while being in the position prior to the beginning of the formation of the groove, should not hamper the pipe feeding, and after the formation of the groove should leave the path of movement of the V-shaped cutter, it will be apparent that the length of the additional cutter in the known die is rather limited by the die dimensions, whereby the possible number of cutting edges is also limited, provided that the number of the cutting edges and their design are based on the requirement of maximum durability of the additional cutter. For that reason a total metal removal, that is the depth of the groove made on the pipe, is also limited. The possibility of cutting thick-walled pipes in this case is also limited, since with an increase in the diameter of the pipe, especially in cutting thick-walled pipes, it may appear that the groove depth is insufficient, and during the cutting of the pipe its unsupported portion will be deflected in the zone of penetration of the V-shaped cutter, thereby distorting the shape of the pipe, while the service life of the V-shaped cutter is also reduced.

Furthermore, after each cutting of the pipe the additional cutter of the known die must be immediately returned into the initial position, and every time it is dragged over the walls of the pipe, which is already cut, thus resulting in wear not only of the cutting edge, but also of the side edge of the tooth and in rapid wear thereof.

It is an object of the invention to eliminate the above-mentioned disadvantages.

One of the objects of the present invention is to provide a die for cutting pipes in which means providing the preliminary formation of a groove is constructed in such a manner as to ensure the cutting of pipes having a large wall thickness (8–20 mm) while retaining the size of the known dies.

Another object of the invention is to provide a die in which means providing the preliminary formation of a groove is constructed in such a manner as to prolong the service life of each tooth.

These and other objects are accomplished in a die for cutting pipes, wherein the use is made of a flat V-shaped cutter fixed to the upper plate of the die, which is adapted to penetrate between two bed dies mounted on the lower plate of the die and adapted to clamp the pipe being cut, the die comprising means providing the preliminary formation of a groove on the pipe surface at the point of cutting, said means being mounted on the lower plate and operatively connected to the upper plate, wherein according to the invention said means providing the preliminary formation of the groove comprise a disc cutter which is rotatable in a plane parallel with the plane of movement of the cutter and has a toothed sector defined by radiuses ($R$ and $r$) which differ from each other by an amount ($a$) of the groove depth, while the number of teeth of the disc cutter is determined based upon the condition of removal of minimum layer of material with one tooth, and a recess having a surface which is in equally spaced relation to the pipe surface so as to ensure longitudinal displacement of the pipe under the cutter.

This embodiment of the die permits to prolong the service life of each tooth of the disc cutter without increasing the die size, while ensuring the tooth wear only along the cutting edge and offering the possibility of cutting pipes having a wall thickness of up to 20 mm.

It is the most expedient that means providing the preliminary formation of the groove comprise an overrunning clutch to rotate the disc cutter in a shaft integral with the disc cutter, said shaft being mounted on the lower plate and having a lever cooperating with the upper plate.

The invention will now be described in detail with reference to the specific embodiment thereof illustrated in the accompanying drawings, in which.

Figure 1:
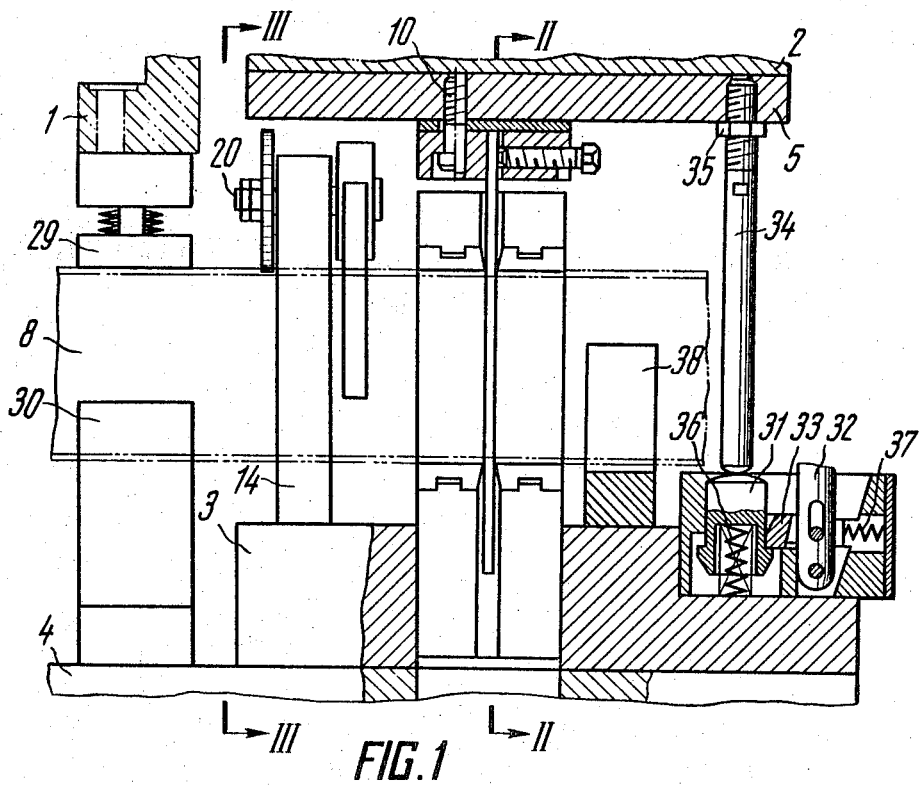
FIG. 1 shows a diagrammatic view of a die for cutting pipes according to the invention.

The die according to the invention is installed on a double-action press having the outer slide and the inner slide referred to as 1 (FIG. 1) and 2 respectively, the lower plate 3 of the die is fixed to the platen 4 of the press, while the upper plate 5 of the die is fixed to the inner slide of the press and is vertically movable relative to the lower plate 3 along guiding columns (not shown).

Figure 2:
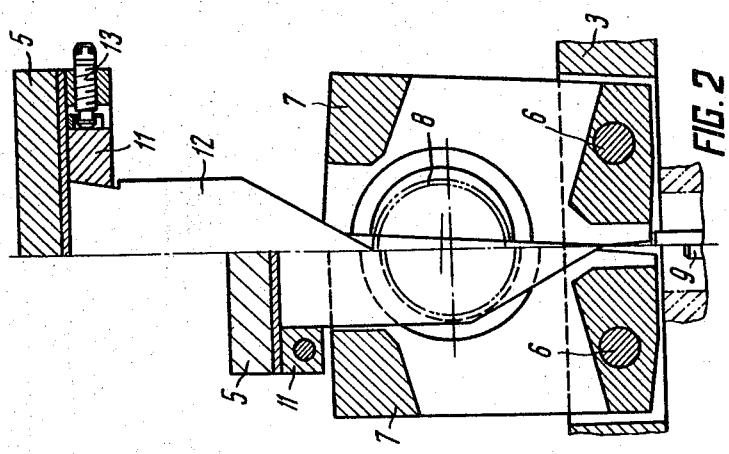
FIG. 2 is a combined sectional view taken along the line II—II in FIG. 1, which illustrates the position of the V-shaped cutter and the bed dies prior to the instant of penetration of the cutter into the pipe (to the right of the axis of symmetry), and upon completion of the pipe cutting (to the left of the axis of symmetry)

The lower plate 3 of the die supports two axles 6 (FIG. 2) mounting two movable bed dies 7 which are adapted to clamp a pipe 8 being cut (the pipe is shown with dash-and-dot line) and driven by an ejector 9 of the press.

Attached to the upper plate 5 of the die by means of bolts 10 (FIG. 1) is a cutter holder 11 (FIG. 2) in which there is mounted a flat V-shaped cutter 12 fixed by means of fixing screws 13 and adapted to penetrate between the two bed dies 7 mounted on the lower plate 3.

Mounted on the lower plate 3 by means of a bracket 14 (FIG. 3) is means providing the preliminary formation of a groove in the pipe 8 being cut, which comprise a disc cutter 15. The disc cutter 15 is provided with at least one toothed sector 16 (FIG. 4) defined by radiuses R and r which differ from each other by an amount "a" equal to the depth of the groove, while the number of teeth of the cutter is determined based upon the condition of removal of minimum layer of material with one tooth. Furthermore, the disc cutter 15 is provided with a recess 17, with the surface 18 of the recess being in equally spaced relation to the surface 19 of the pipe 8 so as to ensure the longitudinal displacement of the pipe which already has the groove for penetration of the flat V-shaped cutter 12 for final cutting of the pipe. The disc cutter 15 is fixed on a shaft 20 mounted in the bracket 14.

Figure 3:
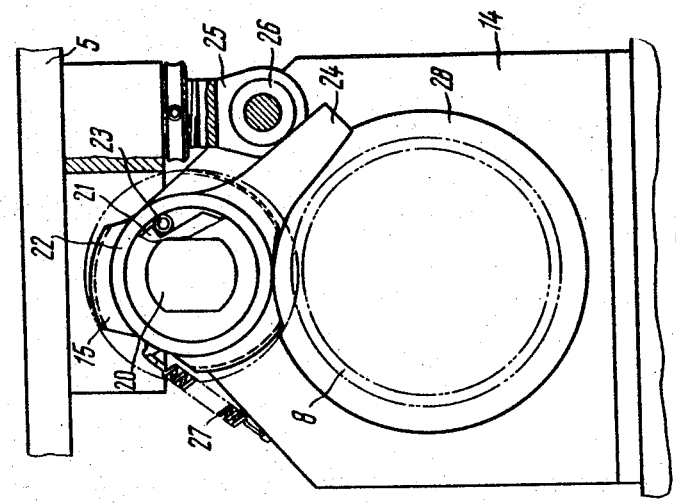
FIG. 3 is a sectional view taken along the line III—III in FIG. 1, which shows the detail of groove forming means as viewed from the side of the overrunning clutch.

Means providing the preliminary formation of the groove also comprise an overrunning clutch mounted on the shaft 20 integral with the disc cutter (FIG. 3).

The overrunning clutch ensures the movement of the disc cutter 15 in one direction only, whereby the service life of the cutter is prolonged.

The overrunning clutch comprises an internal ring 21, external ring 22 and rollers 23 disposed between the rings 21 and 22. Wedging of the rollers 23 between the rings 21 and 22 results in combined rotation of the rings, and therefore in rotation of the disc cutter 15.

The external ring 22 of the clutch is provided with a lever 24 cooperating with the upper plate 5 through the intermediary of a pusher 25 having a roller 26 which rolls over the lever 24 during the lowering of the upper plate 5 of the die. This provides for operative connection of the overrunning clutch, and hence of the disc cutter 15 to the upper plate 5 of the die.

The lever 24 is returned into the initial position by means of a spring 27, one end of which is fixed to the bracket 14, and the other end to the external ring 22 of the overrunning clutch.

The bracket 14 is provided with a bore 28 to receive the pipe 8 being cut. Prior to the beginning of the work stroke, in order to prevent the pipe 8 from being rotated, the latter is fixed by means of a spring-loaded prism 29 (FIG. 1) attached to the outer slide 1 of the press, and by means of a support 30, the pipe 8 being urged against the support during the lowering of the outer slide 1.

In order to ensure the exact alignment between the groove preliminary formed on the pipe and the flat V-shaped cutter, the lower plate 3 of the die is provided with a stop 31 having a lever 32 and an index pin 33. During the lowering of the upper plate 5 of the die the index pin is acted upon by a rod 34, which is fixed to the upper plate 5 by means of a nut 35, so as to retract the stop 31.

The stop 31 and the index pin 33 are returned into the initial position by springs 36 and 37 respectively.

The cut off pipe piece 8 is supported by a bed 38 fixed to the lower plate 3 of the die.

The above-described die functions as follows.

Figure 4:
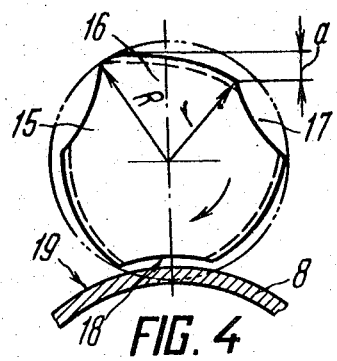
FIG. 4 shows the initial position of the disc cutter, where the upper plate of the die is in the uppermost position.

When in the initial position, the upper plate 5 of the die is in the uppermost position, the disc cutter 15 taking the position shown in FIG. 4, where the disc cutter 15 faces the pipe 8 with its recess 17, and thus does not hamper longitudinal movement of the pipe. In this position the spring-loaded prism 29 does not urge the pipe 8 against the support 30, and the bed dies 7 are brought apart by the ejector 9 of the press.

In this position the pipe 8 is moved up to the stop 30.

Upon energization of the press the outer slide 1 urges the pipe 8 against the support 30 by means of the spring-loaded prism 29 so as to prevent it from being rotated during the penetration of the disc cutter 15 into the body of the pipe 8. Then the inner slide 2 of the press begins to move together with the upper plate 5 of the die, the cutter holder 11 and the flat V-shaped cutter 12 fixed thereto. The ejector 9 of the press is lowered to release the bed dies 7, whereafter the bed dies can be brought together to clamp the pipe.

Figure 6:
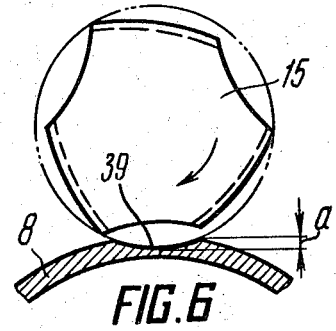
FIG. 6 is the final position of the disc cutter, where the formation of the groove is completed, and the disc cutter does not hamper longitudinal displacement of the pipe.

During the lowering of the upper plate 5 of the die with the roller 26 the pusher 25 mounted on the upper plate 5 of the die acts upon the lever 24 to rotate the external ring of the overrunning clutch about the shaft 20 thereby resulting in wedging of the rollers 23 between the internal and external rings 21 and 22, whereby the disc cutter 15 will begin to rotate together with the external ring 22 of the overrunning clutch as one piece and to penetrate into the body of the pipe 8 to form therein a groove 39 (FIG. 6).

Figure 5:
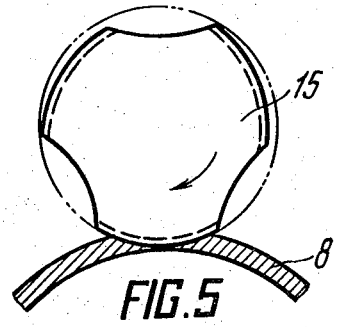
FIG. 5 is an intermediate position of the disc cutter, where one of the cutter sectors is penetrating into the pipe body to form the groove.

The instant, at which one of the toothed sectors of the disc cutter 15 penetrates into the body of the pipe 8, is shown in FIG. 5.

Concurrently with the formation of the groove 39 by the disc cutter 15 the flat V-shaped cutter 12 penetrates into the pipe 8 in the zone of the preliminary made groove 39. It should be noted that at the instant of penetration of the flat V-shaped cutter 12 into the pipe 8 the bed dies 7, while rotating on the axles 6, are brought together and clamp the pipe 8 for further cutting thereof.

The rotation of the disc cutter 15 is selected in such a manner that during one downward stroke of the inner slide 2 the groove shown in FIG. 6 is formed on the pipe 8, and the toothed sector 16 leaves the body of the pipe 8 without hampering its longitudinal displacement.

FIG. 6 shows the position of the disc cutter 5 relative to the pipe 8 at the lowermost position of the inner slide 2 of the press.

Prior to completion of the downward stroke of the inner slide 2 of the press the rod 34 fixed to the upper plate 5 acts upon the stop 31, while the index pin 33 holds the stop 31 in the lowermost position by means of the spring 36.

Upon cutting the pipe 8 the inner slide 2 of the press begins to move upwards, the pusher 25 with roller 26 also moving upwards to release the lever 24.

The external ring 22 of the overrunning clutch is returned into the initial position by means of the spring 27, and the internal ring 21 with the disc cutter 15 remains stationary, since the rollers 23 roll out of the wedge-shaped space, and the external ring 22 and the internal ring 21 are disconnected from each other.

Prior to completion of the upward stroke of the inner slide 2 the ejector 9 of the press is also moved upwards to separate the bed dies 7. At the same time the outer slide 1 is also moved upwards to retract the spring-loaded prism 29 from the pipe 8, which now is not urged against the support 30.

The pipe 8 is completely released and can be longitudinally displaced under the flat V-shaped cutter 12.

During this movement the pipe 8 will displace a pipe piece cut beforehand and supported on the bed 38, which pipe piece acts upon the lever 32, and the latter compresses the spring 37 of the index pin 33 to release the stop 31 and to return it into the initial position. The pipe is moved by the spring 36 up to the stop 31. The die is ready to perform the next cycle of operation.

What is claimed is:

1. A die for cutting pipes comprising: an upper plate; a lower plate; two bed dies for clamping the pipe being cut which are mounted on said lower plate; a flat V-shaped cutter fixed to said upper plate and adapted to penetrate between said bed dies; means providing the preliminary formation of a groove on the pipe surface at the point of cutting by said cutter, said means being mounted on said lower plate and operatively connected to said upper plate; a disc cutter of said means providing the preliminary formation of the groove rotatable in a plane parallel with the plane of movement of said flat cutter, the toothed sector of said disc cutter being defined by radiuses (R and r) which differ from each other by an amount of the groove depth; the number of teeth of said disc cutter being determined based upon the condition of removal of minimum layer of material with one tooth; a recess made on said disc cutter, the surface of the recess being in equally spaced relation to the pipe surface for longitudinal displacement of the pipe to under said flat cutter.

2. A die as claimed in claim 1, wherein said means providing the preliminary formation of the groove is provided with an overrunning clutch adapted to rotate the disc cutter, said clutch being mounted on a shaft integral with the disc cutter, which is mounted on the lower plate, and comprising a lever cooperating with the upper plate.

* * * * *